United States Patent
Shiratori

(10) Patent No.: US 11,012,583 B2
(45) Date of Patent: May 18, 2021

(54) IMAGE PROCESSING APPARATUS AND NON-TRANSITORY COMPUTER READABLE MEDIUM

(71) Applicant: FUJI XEROX CO., LTD., Tokyo (JP)

(72) Inventor: Kana Shiratori, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 167 days.

(21) Appl. No.: 16/026,506

(22) Filed: Jul. 3, 2018

(65) Prior Publication Data

US 2019/0028596 A1 Jan. 24, 2019

(30) Foreign Application Priority Data

Jul. 18, 2017 (JP) .............................. JP2017-139011

(51) Int. Cl.
*H04N 1/00* (2006.01)

(52) U.S. Cl.
CPC ....... *H04N 1/0066* (2013.01); *H04N 1/00145* (2013.01); *H04N 1/00167* (2013.01); *H04N 1/00411* (2013.01); *H04N 1/00453* (2013.01); *H04N 1/00461* (2013.01); *H04N 1/00954* (2013.01)

(58) Field of Classification Search
CPC ............. H04N 1/0066; H04N 1/00145; H04N 1/00167; H04N 1/00411; H04N 1/00453; H04N 1/00461; H04N 1/00954
USPC ......................................... 358/2.1, 1.9, 1.15
See application file for complete search history.

(56) References Cited

U.S. PATENT DOCUMENTS

2011/0013203 A1* 1/2011 Grosz .................. G06K 9/6267
358/1.2
2011/0141492 A1* 6/2011 Ebuchi ................. H04N 1/3875
358/1.2

FOREIGN PATENT DOCUMENTS

| JP | H05-328091 A | 12/1993 |
| JP | 2003-046763 A | 2/2003 |
| JP | 2006-56176 A | 3/2006 |
| JP | 2008-199210 A | 8/2008 |

OTHER PUBLICATIONS

Mar. 2, 2021 Office Action issued in Japanese Patent Application No. 2017-139011.

* cited by examiner

*Primary Examiner* — Quang N Vo
(74) *Attorney, Agent, or Firm* — Oliff PLC

(57) ABSTRACT

An image processing apparatus includes a selector and an instructor. The selector selects an image. The instructor provides an instruction if an aspect ratio of the selected image exceeds a maximum ratio of a range of predetermined aspect ratios. The instruction is an instruction to remove an end portion of the selected image in a width direction so that the aspect ratio of the selected image will be contained within the range of the predetermined aspect ratios. The instructor also provides an instruction if the aspect ratio of the selected image is smaller than a minimum ratio of the range of the predetermined aspect ratios. The instruction is an instruction to add a margin to an end portion of the selected image in the width direction so that the aspect ratio of the selected image will be contained within the range of the predetermined aspect ratios.

16 Claims, 11 Drawing Sheets

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-139011 filed Jul. 18, 2017.

BACKGROUND

Technical Field

The present invention relates to an image processing apparatus and a non-transitory computer readable medium.

SUMMARY

According to an aspect of the invention, there is provided an image processing apparatus including a selector and an instructor. The selector selects an image. The instructor provides an instruction if an aspect ratio of the selected image exceeds a maximum ratio of a range of predetermined aspect ratios. The instruction is an instruction to remove an end portion of the selected image in a width direction so that the aspect ratio of the selected image will be contained within the range of the predetermined aspect ratios. The instructor also provides an instruction if the aspect ratio of the selected image is smaller than a minimum ratio of the range of the predetermined aspect ratios. The instruction is an instruction to add a margin to an end portion of the selected image in the width direction so that the aspect ratio of the selected image will be contained within the range of the predetermined aspect ratios.

BRIEF DESCRIPTION OF THE DRAWINGS

An exemplary embodiment of the present invention will be described in detail based on the following figures, wherein.

DETAILED DESCRIPTION

Overview of Exemplary Embodiment

An image processing apparatus includes a selector and an instructor. The selector selects an image. The instructor provides an instruction if an aspect ratio of the selected image exceeds a maximum ratio of a range of predetermined aspect ratios. The instruction is an instruction to remove an end portion of the selected image in a width direction so that the aspect ratio of the selected image will be contained within the range of the predetermined aspect ratios. The instructor also provides an instruction if the aspect ratio of the selected image is smaller than a minimum ratio of the range of the predetermined aspect ratios. The instruction is an instruction to add a margin to an end portion of the selected image in the width direction so that the aspect ratio of the selected image will be contained within the range of the predetermined aspect ratios.

Images that may be selected by the selector include various images having different aspect ratios, such as landscape images having a relatively large aspect ratio captured by a feature phone (smartphone) provided with a camera function, and squarish images obtained via a social networking service (SNS).

The selector may select an image from among images stored in a storage unit of the image processing apparatus or images stored in an external storage unit, such as a cloud server.

"The aspect ratio of an image" is a ratio of the shorter side (height) to the longer side (width) of the image. Even if a photo is taken as a portrait image (the longer side is the height), the aspect ratio is calculated by assuming that the longer side is the width and the shorter side is the height. "The width direction of an image" is a direction in which the longer side of the image is placed horizontally.

Details of Exemplary Embodiment

Figure 1:
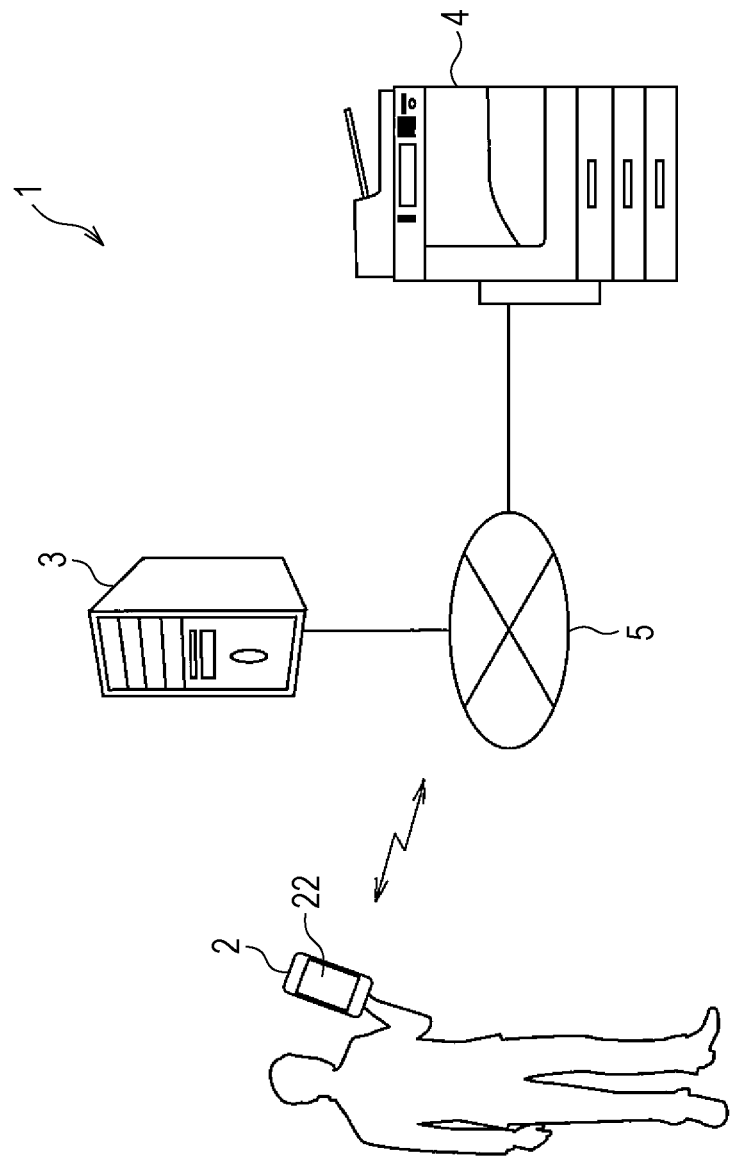
FIG. 1 illustrates an example of the configuration of an image forming system according to the exemplary embodiment.

FIG. 1 illustrates an example of the configuration of an image forming system 1 according to an exemplary embodiment of the invention. The image forming system 1 includes a terminal device 2 that is operated by a user, a server device 3 that manages images, and an image forming device 4 that performs image processing in response to an instruction from a user. The terminal device 2, the server device 3, and the image forming device 4 are connected to each other via the Internet 5. The terminal device 2 is an example of an image processing apparatus.

As the terminal device 2, a mobile information processing apparatus, such as a personal computer (PC), a feature phone (smartphone), may be used.

When the terminal device 2 uploads an image, such as a photo file, selected by a user to the server device 3, the server device 3 informs the terminal device 2 of a reservation number assigned to the photo file.

Upon receiving a photo file from the terminal device 2, the server device 3 issues a reservation number for the photo file and informs the terminal device 2 of the issued reservation number. In response to a request to send a photo file by using a reservation number from the image forming device 4, the server device 3 sends the photo file to the image forming device 4.

The image forming device 4 is a multifunction device having multiple functions, such as scan, print, fax, and copy functions, as image processing functions. The image forming device 4 is installed in a store, such as a convenience store, a photo service store, a print service store, or a department store, or a facility, such as a library, a municipal office, or a hospital.

Upon receiving a reservation number and an image print request from a user, the image forming device 4 sends a request to send a photo file to the server device 3 by using the reservation number. Then, upon receiving the photo file corresponding to the reservation number from the server device 3, the image forming device 4 prints a photo included in the file on a photo sheet (also called a print sheet) of a standardized size (large size, for example). The standardized size of photos is not restricted to a large size. A user may select one of plural standardized sizes.

Figure 2:
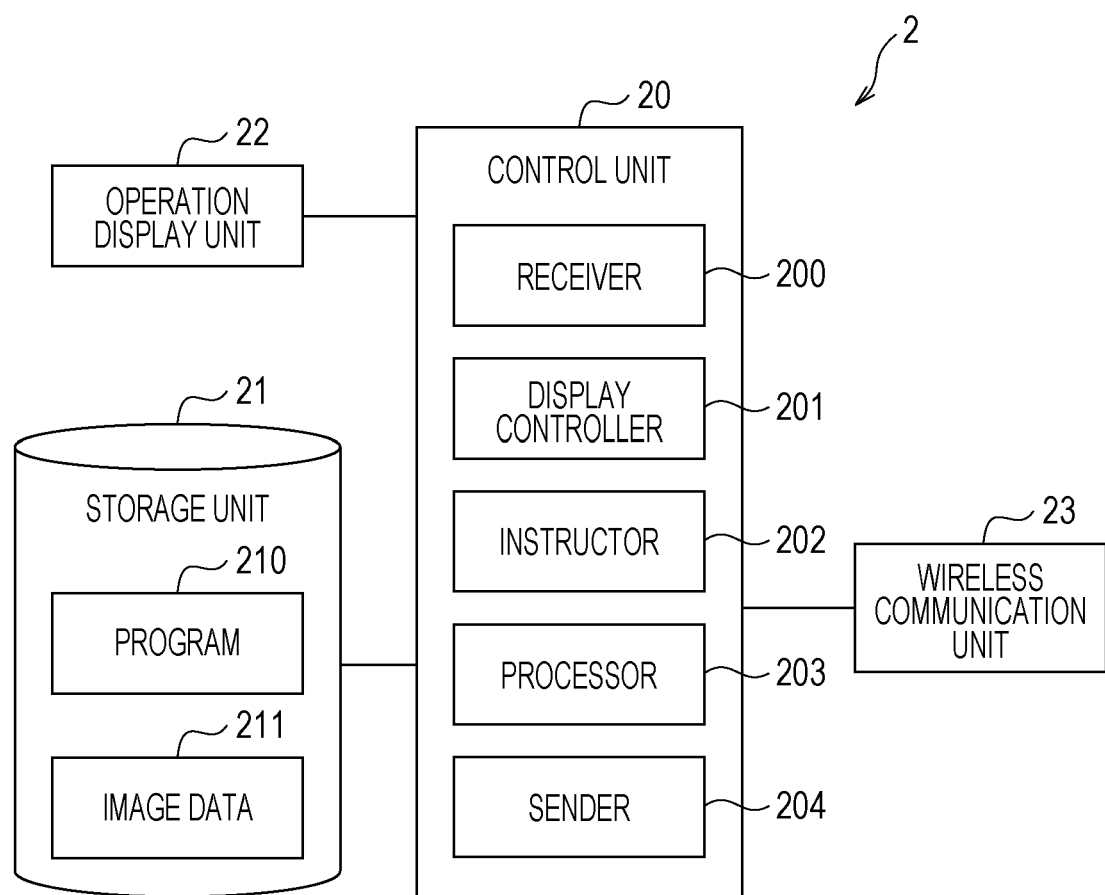
FIG. 2 is a block diagram illustrating an example of a control system of a terminal device.

FIG. 2 is a block diagram illustrating an example of a control system of the terminal device 2. The terminal device 2 includes a control unit 20 that controls the individual elements of the terminal device 2, a storage unit 21 that stores various items of information, an operation display unit 22, and a wireless communication unit 23.

The control unit 20 is constituted by a central processing unit (CPU), an interface, and so on. As a result of operating in accordance with a program 210 stored in the storage unit 21, the CPU functions as a receiver 200, a display controller 201, an instructor 202, a processor 203, and a sender 204. Details of the receiver 200, the display controller 201, the instructor 202, the processor 203, and the sender 204 will be discussed later. The receiver 200 is an example of a selector.

The storage unit 21 is constituted by a read only memory (ROM), a random access memory (RAM), a hard disk, and so on, and stores the program 210 and image data 211, for example. An example of the program 210 is an application for managing photos stored in the storage unit 21.

The operation display unit 22 includes a touchscreen display constituted by a display, such as a liquid crystal display, and a touchscreen superposed on the display. The operation display unit 22 displays a display screen on the display and receives operation performed on the touchscreen by a user. The operation display unit 22 may alternatively be constituted by an input unit and a display which are separately provided.

The wireless communication unit 23 performs wireless communication with the server device 3 via Wi-Fi and the Internet 5, for example.

The receiver 200 receives operation performed on the operation display unit 22 and on screens displayed by the operation display unit 22.

The display controller 201 performs control so that various screens will be displayed on the display of the operation display unit 22, based on operation performed on the operation display unit 22 by a user. Examples of the various screens are a menu screen 100 (see FIG. 3), a photo selection screen 110 (see FIGS. 4 and 7), a trimming screen 120 (see FIG. 5), a margin add screen 130 (see FIG. 6), a reservation number list screen (see FIG. 8), a photo cancel screen 150 (see FIG. 9), and a download screen. The trimming screen 120 and the margin add screen 130 are examples of a check screen.

If the aspect ratio of an image selected by a user exceeds the maximum ratio of the range of predetermined aspect ratios, the display controller 201 performs control so that a thumbnail image of the selected image will be displayed on the trimming screen 120 and so that the range of the image to be reduced (trimmed) will be changeable. The thumbnail image is a scaled-down image generated by reducing the number of pixels of an original image. A thumbnail image is an example of a scaled-down image.

If the aspect ratio of an image selected by a user exceeds the maximum ratio of the range of the predetermined aspect ratios, the instructor 202 provides an instruction to remove an end portion of the image in the width direction so that the aspect ratio of the resulting image will be contained within the range of the predetermined aspect ratios. If the aspect ratio of the selected image is smaller than the minimum ratio of the range of the predetermined aspect ratios, the instructor 202 provides an instruction to add a margin to an end portion of the image in the width direction so that the aspect ratio of the resulting image will be contained within the range of the predetermined aspect ratios. The range of the predetermined aspect ratios is a range including the standardized aspect ratio of photos (1:about 1.4 for large size photos, for example). An example of the range of the predetermined aspect ratios is 1:1.3 to 1:1.5, which represents the ratio of the shorter side (height) to the longer side (width) of an image. Even if a photo is taken as a portrait image (the longer side is the height), the aspect ratio is calculated by assuming that the longer side is the width and the shorter side is the height.

To adjust an image of a certain aspect ratio to a sheet of a different aspect ratio, two approaches may be taken. For a landscape image having a relatively large aspect ratio, an end portion of the image in the width direction is removed or a margin is added to an end portion of the image in the height direction. For a squarish image, a margin is added to an end portion of the image in the width direction or an end portion of the image in the height direction is removed. Smartphones are becoming wider, and photos taken by smartphones are accordingly becoming wider. Concerning a photo image having an aspect ratio of 1:2, for example, if a margin is added to an end portion of the image in the height direction, the ratio of the margin to the entire image results in as high as 30%, and the resulting image is reduced to about 70%, compared with when an end portion of the original image in the width direction is trimmed. Most of photos posted on SNSs, such as Instagram, are squarish. A user usually wants to post the entire image of a photo. Adding of a margin to an image is thus more preferable than trimming of the image.

The processor 203 executes image processing in accordance with instructions provided by the instructor 202. Examples of the image processing are trimming, margin adding, and enlarging/reducing.

The sender 204 sends a selected image as a file to the server device 3 via the Internet 5 by using the wireless communication unit 23.

Screens displayed on the operation display unit 22 under the control of the display controller 201 will be discussed below with reference to FIGS. 3 through 8.

Figure 3:
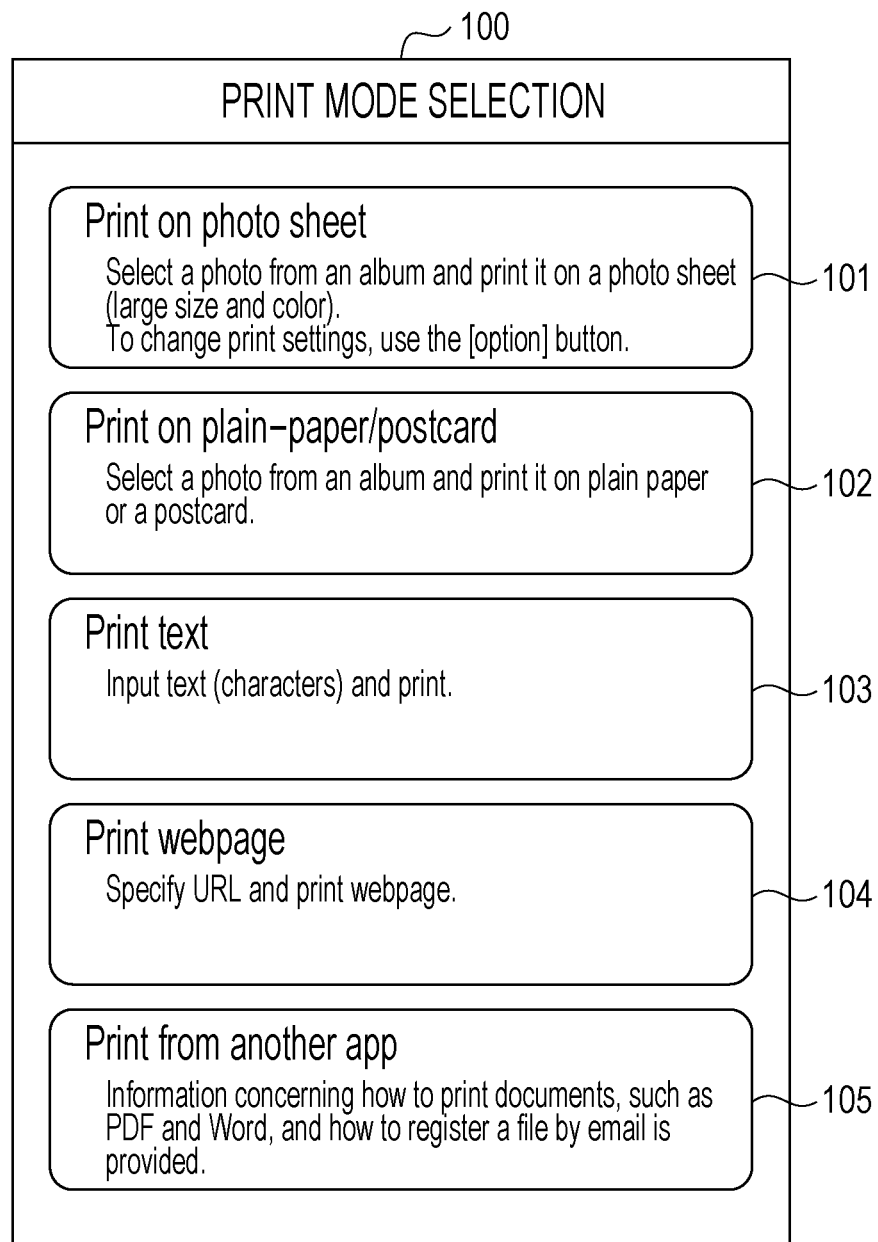
FIG. 3 illustrates an example of a menu screen.

FIG. 3 illustrates an example of a menu screen displayed on the operation display unit 22. On a menu screen 100, plural print modes 101 through 105, such as "print on photo sheet", "print on plain-paper/postcard", "print text", "print webpage", and "print from another app", are displayed. A user can select one of the print modes 101 through 105.

Details of the print mode 101 "print on photo sheet" will be discussed later, and an explanation thereof will be omitted here. The print mode 102 "print on plain-paper/postcard" is a mode in which a photo is selected from an album and is printed on plain paper or a postcard. The print mode 103 "print text" is a mode in which characters are input as text and are printed on plain paper. The print mode 104 "print webpage" is a mode in which a webpage selected by using a uniform resource locator (URL) is printed on plain paper. The print mode 105 "print from another app" is a mode in which information concerning how to print documents described in Portable Document Format (PDF) and Word, for example, and concerning how to register a file by email is provided. When the print modes 102 through 105 other than the print mode 101 "print on photo sheet" are selected, a screen for setting print settings including a setting for a sheet type and a check screen for checking the content of print settings are displayed.

When the print modes 102 through 105 other than the print mode 101 "print on photo sheet" are selected, the display controller 201 performs control so that a sheet selection screen for selecting a sheet type will be displayed. If a sheet other than a photo sheet is selected on the sheet selection screen, the processor 203 may not perform image processing based on the aspect ratio. If a sheet other than a photo sheet is selected on the sheet selection screen, the display controller 201 may perform control so that check screens for checking a selected sheet type and for checking the content of print settings will be displayed.

Figure 4:
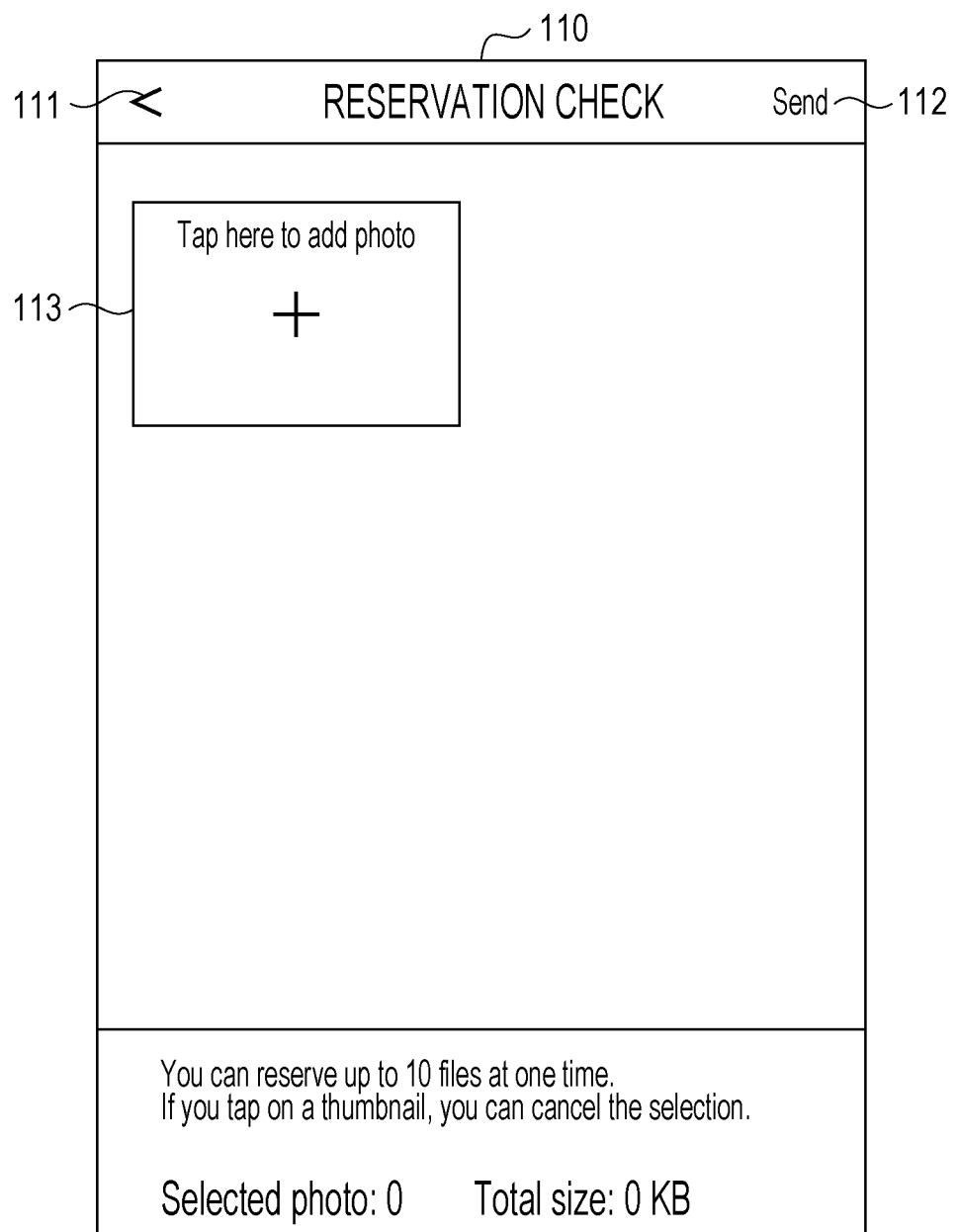
FIG. 4 illustrates an example of a photo selection screen indicating a state in which no photos are selected.

FIG. 4 illustrates an example of a photo selection screen displayed on the operation display unit 22 when the print mode 101 "print on photo sheet" is selected on the menu screen 100 in FIG. 3. On a photo selection screen 110, a return button 111 for returning to the previous screen, a send button 112 for sending information concerning the input operation, and an add region 113 for allowing a user to add a photo by taping on the add region 113 are displayed.

Figure 5:
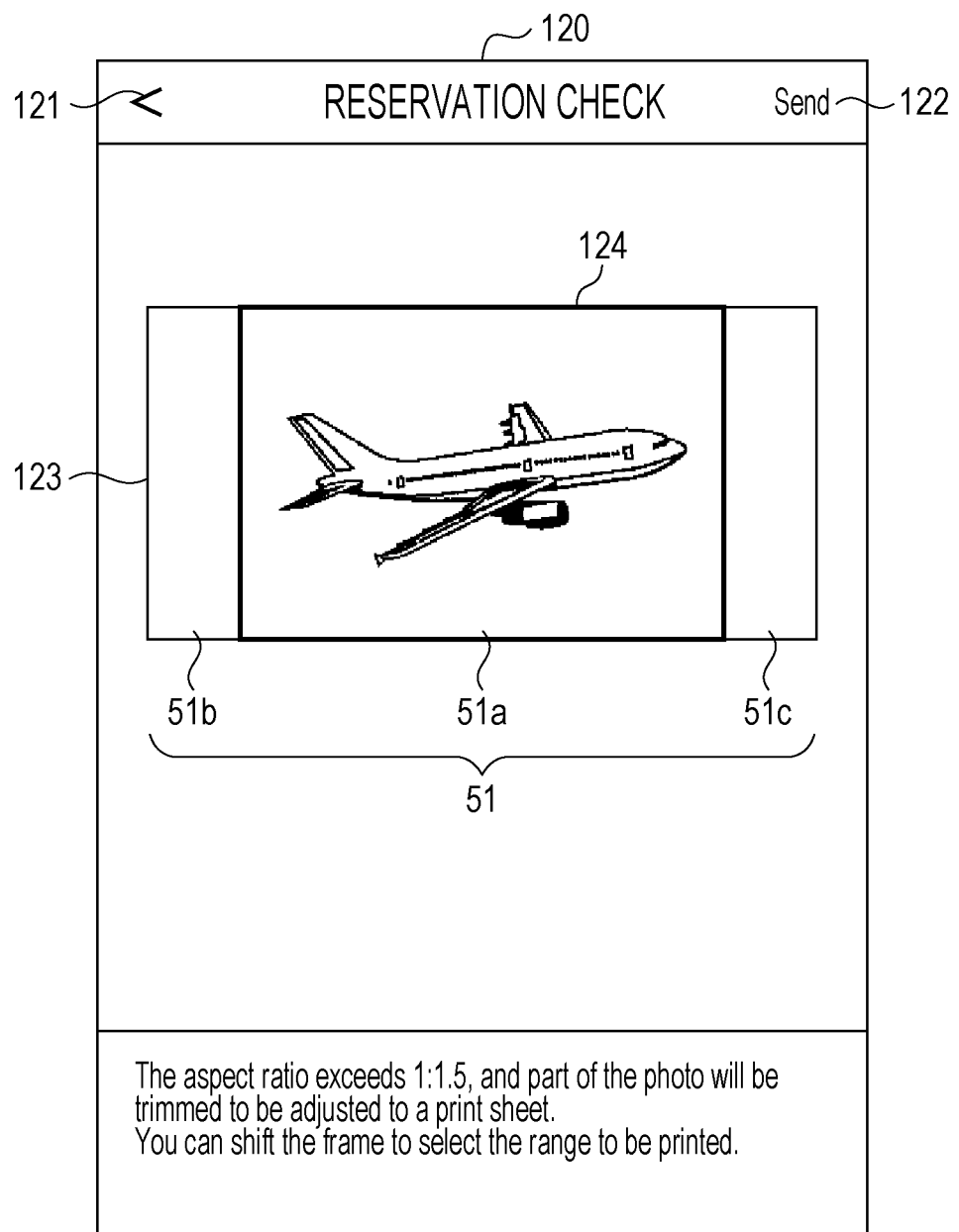
FIG. 5 illustrates an example of a trimming screen.

FIG. 5 illustrates an example of a trimming screen. A trimming screen 120 includes a return button 121 for returning to the previous screen, an OK button 122 for accepting the processing content, and a display region 123. In the display region 123, a photo to be trimmed is displayed. In the example in FIG. 5, the aspect ratio of an original photo 51 exceeds the maximum ratio (1:1.5) of the range of the predetermined aspect ratios (1:1.3 to 1:1.5, for example). A trimming frame 124 indicated by the thick solid lines having an aspect ratio of 1:1.5 is thus superposed on the original photo 51. The trimming frame 124 is horizontally shiftable as a result of a user touching the trimming frame 124. For example, the user touches a portion of the trimming frame 124 with a finger and then slides the finger on the original photo 51. The trimming frame 124 is an example of a mark indicating the range of a photo which has been trimmed (the range of a processed photo 51a).

Figure 6:
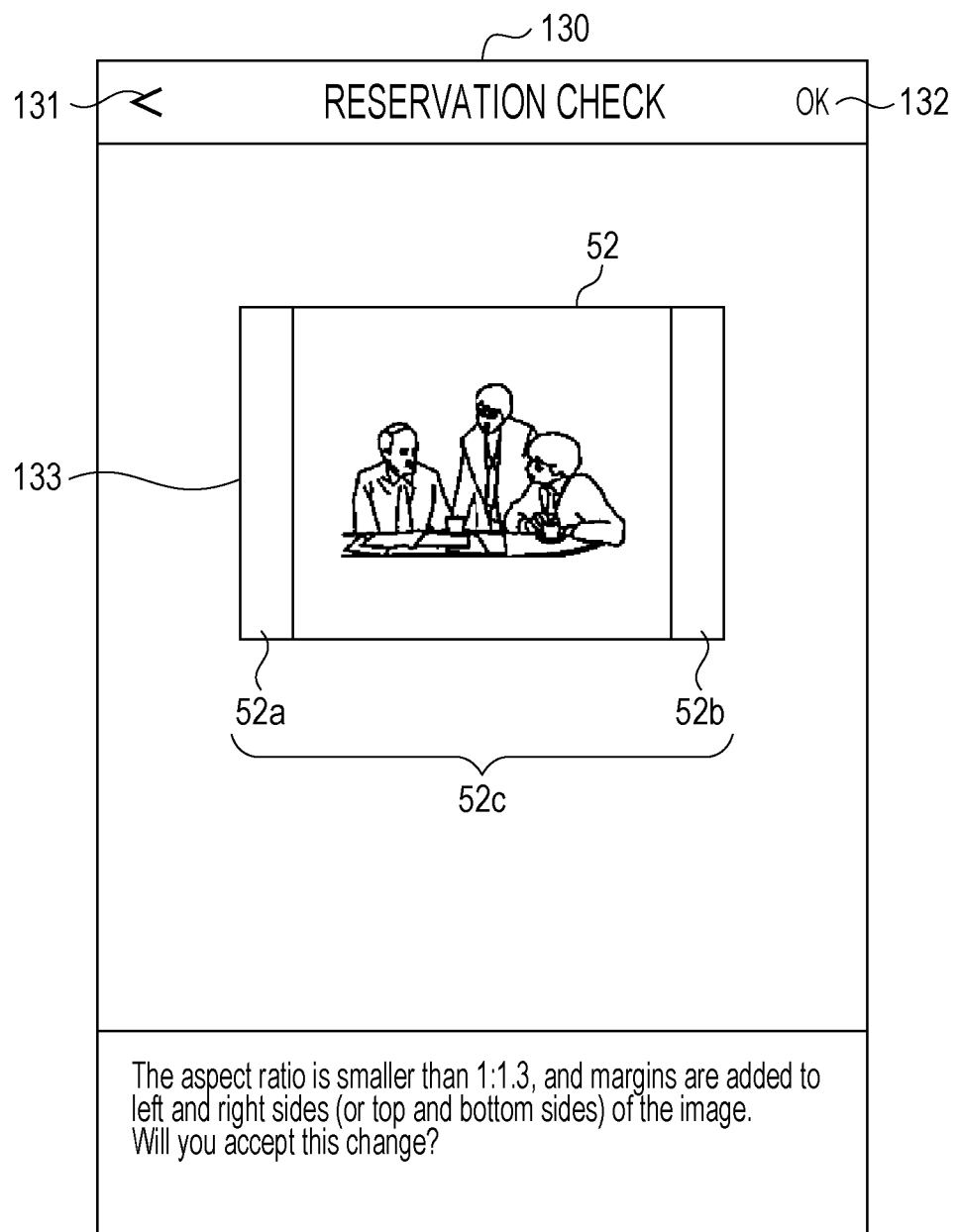
FIG. 6 illustrates an example of a margin add screen.

FIG. 6 illustrates an example of a margin add screen. As in the trimming screen 120 in FIG. 5, a margin add screen 130 includes a return button 131 for returning to the previous screen, an OK button 132 for accepting the processing content, and a display region 133. In the display region 133, a photo to be subjected to margin adding processing is displayed. In the example in FIG. 6, the aspect ratio of an original photo 52 is smaller than the minimum ratio (1:1.3) of the range of the predetermined aspect ratios (1:1.3 to 1:1.5, for example). Margins 52a and 52b are thus added to both sides of the original photo 52.

Figure 7:
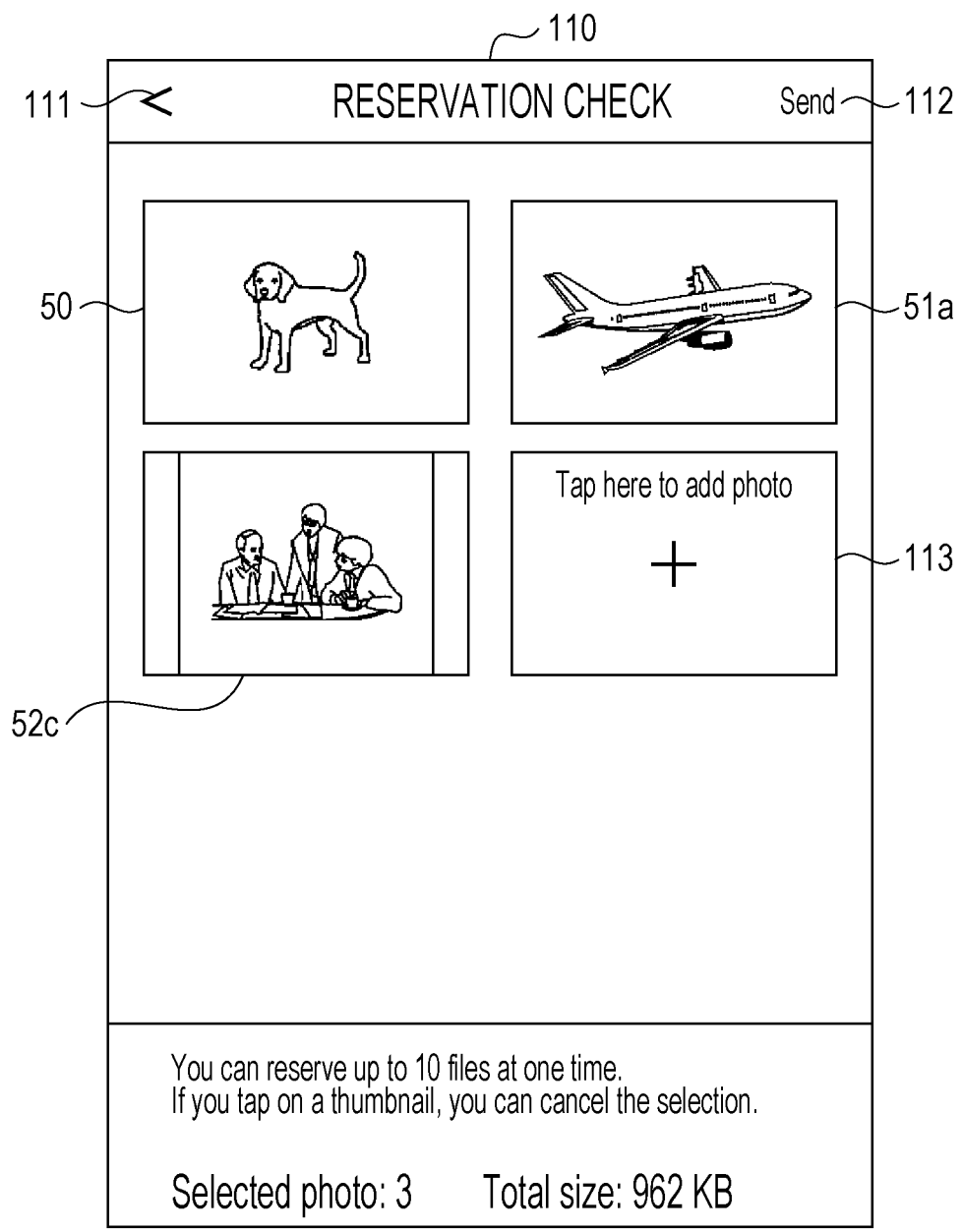
FIG. 7 illustrates an example of a photo selection screen indicating a state in which plural photos are selected.

FIG. 7 illustrates an example of a photo selection screen 110 indicating a state in which plural photos are selected. On the photo selection screen 110, an unprocessed original photo 50, the processed photo 51a subjected to trimming, and a processed photo 52c with added margins are disposed as thumbnail images.

Figure 8:
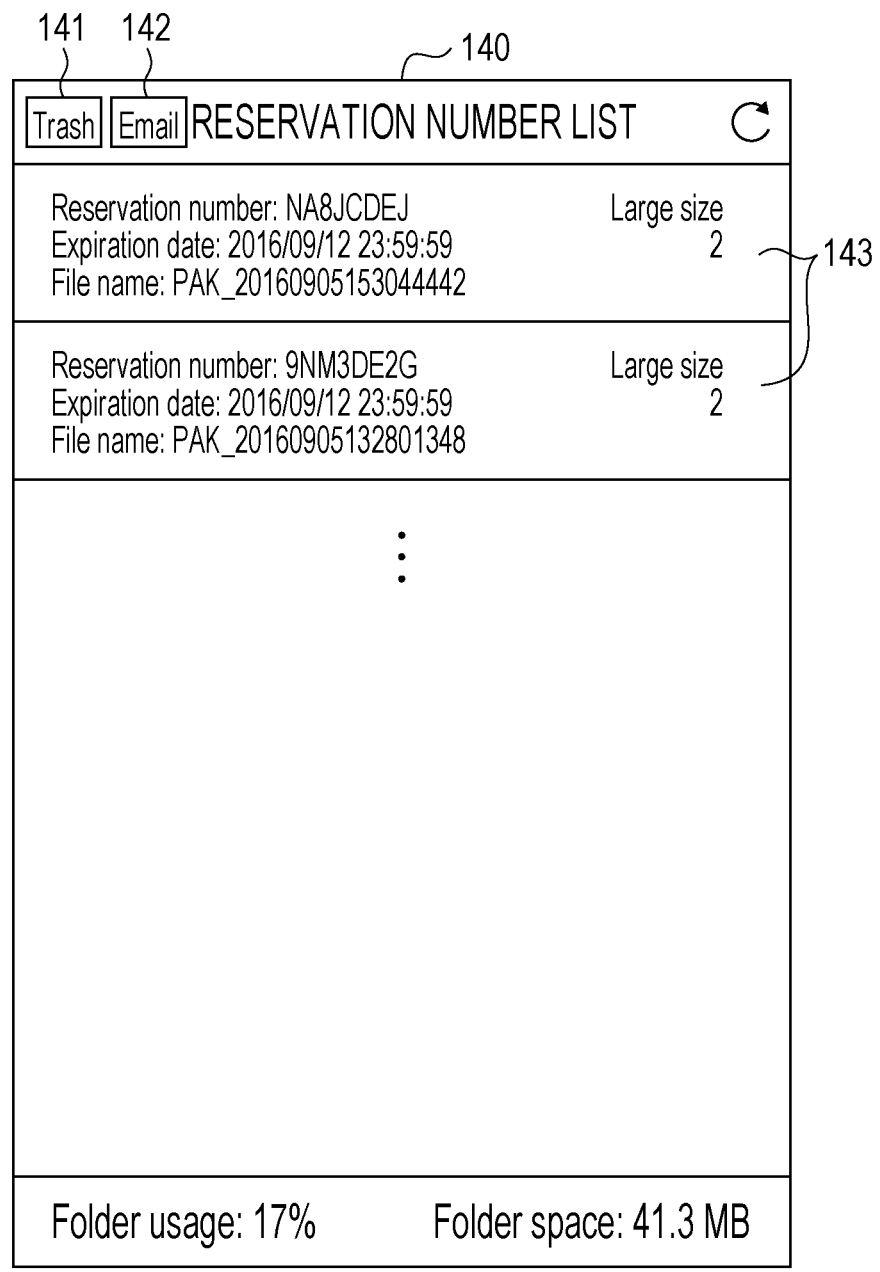
FIG. 8 illustrates an example of a reservation number list screen.

FIG. 8 illustrates an example of a reservation number list screen. A reservation number list screen 140 is a screen displayed on the operation display unit 22 after a photo is uploaded. On the reservation number list screen 140, a list of reserved files 143 is displayed. The files 143 are displayed in chronologically descending order, that is, the file 143 uploaded most recently is displayed on the top of the list. A reservation number is assigned to an uploaded file 143, and also, the expiration date, the file name, the print sheet size (large size, for example), and the number of photos in the file (two, for example) are displayed.

On the reservation number list screen 140, a trash icon 141 and an email icon 142 are displayed. As a result of selecting one file 143 in the list and selecting the trash icon 141, this file 143 can be deleted. As a result of selecting one file 143 and selecting the email icon 142, this file 143 can be sent by email.

Operation of Exemplary Embodiment

An example of the operation of the image forming system 1 will be described below. A description will be given, assuming that a photo is printed.

(1) Overall Process

The overall process of the operation will first be discussed below. By operating the operation display unit 22 of the terminal device 2, a user selects a photo and uploads it to the server device 3 as a file. The server device 3 manages the file by assigning a reservation number to the file, and also informs the user of the reservation number.

At a location where the image forming device 4 is installed, the user inputs the reservation number into the image forming device 4. If the input reservation number matches the number managed by the server device 3, the server device 3 sends the file uploaded by the user to the image forming device 4. The image forming device 4 then prints the photo included in the file received from the server device 3 on a photo sheet (also called a print sheet).

(2) Uploading of Photo

Figure 11:
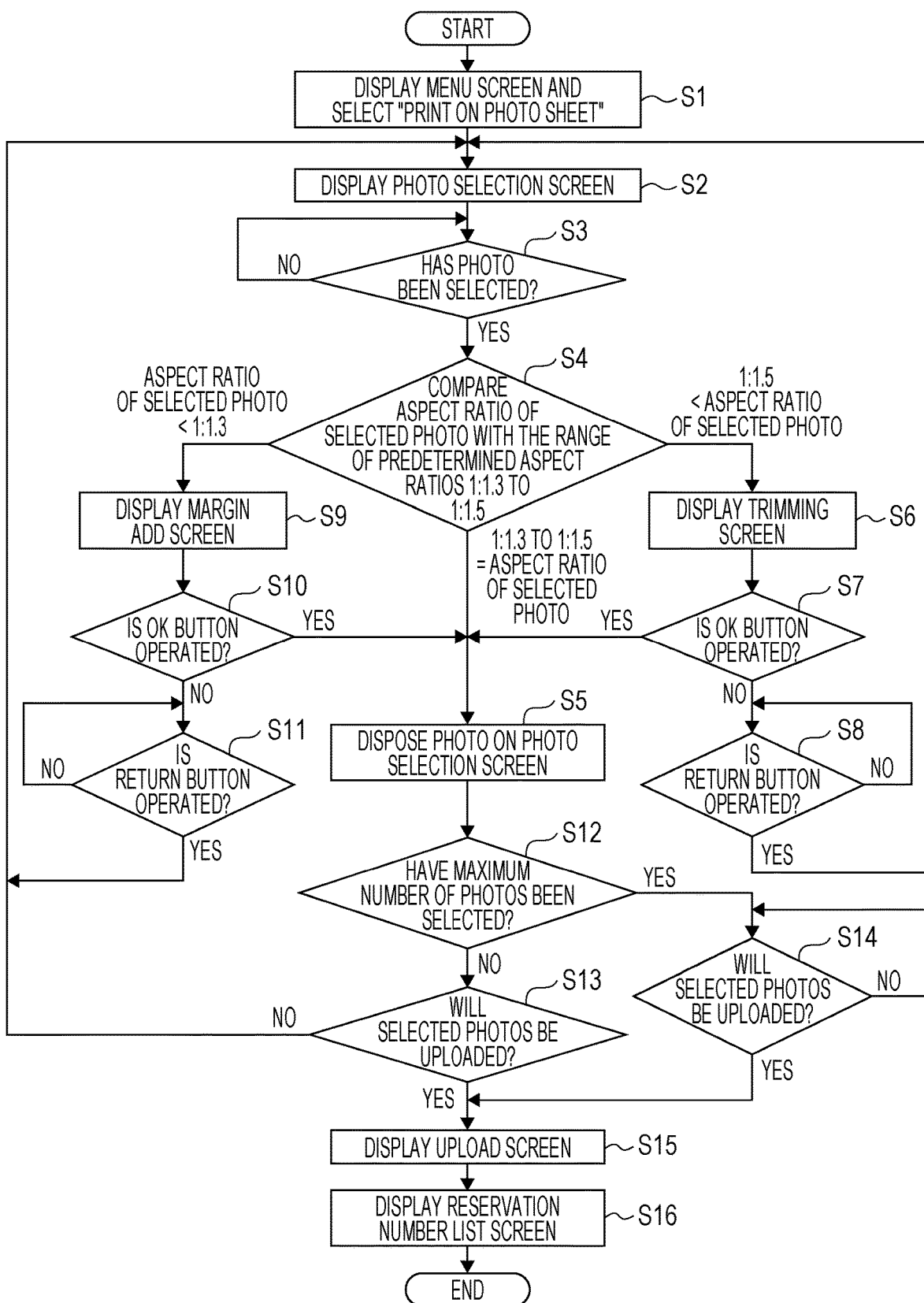
FIG. 11 is a flowchart illustrating an example of the operation of the terminal device.

Uploading of a photo will be discussed below with reference to the flowchart of FIG. 11.

In step S1, in response to a request to display the menu screen 100 as a result of a user operating the operation display unit 22 of the terminal device 2, the display controller 201 performs control so that the menu screen 100 will be displayed on the operation display unit 22, as shown in FIG. 3. On the menu screen 100, the plural print modes 101 through 105 are displayed. It is assumed that the user has selected the print mode 101 "print on photo sheet".

In step S2, the receiver 200 receives the selection of the print mode 101 "print on photo sheet", and the display controller 201 performs control so that the photo selection screen 110 will be displayed on the operation display unit 22, as shown in FIG. 4.

As a result of the user tapping on the add region 113 of the photo selection screen 110, the application for managing photos is started to display a list of photos. If the user has selected a photo from the list (YES in step S3), the instructor 202 compares the aspect ratio of the selected photo with the range of the predetermined aspect ratios in step S4.

If the instructor 202 judges in step S4 that the aspect ratio of the selected photo, such as the original photo 50 (see FIG. 7), is included in the range of the predetermined aspect ratios (1:1.3 to 1:1.5, for example), it informs the display controller 201 that the original photo 50 does not need any processing.

In step S5, the display controller 201 performs control so that a thumbnail image of the original photo 50 will be displayed on the top left side of the photo selection screen 110, as shown in FIG. 7.

If the instructor 202 judges in step S4 that the aspect ratio of the selected photo, such as the original photo 51 (see FIG. 5), exceeds the maximum ratio (1:1.5, for example) of the range of the predetermined aspect ratios, it informs the display controller 201 that the original photo 51 needs trimming.

In step S6, the display controller 201 performs control so that the trimming screen 120 including the photo 51 will be displayed on the operation display unit 22, as shown in FIG. 5. The display controller 201 also performs control so that the trimming frame 124 indicating the range of trimming processing will be superposed on the photo 51. Regions outside the trimming frame 124 (called trimming regions) 51b and 51c are regions to be removed by trimming processing.

If the OK button 122 on the trimming screen 120 is operated (YES in step S7), the processor 203 performs trimming processing for removing the trimming regions 51b and 51c outside the trimming frame 124. As a result of trimming processing, the photo 51a is created.

In step S5, the display controller 201 performs control so that a thumbnail image of the processed photo 51a will be displayed on the top right side of the photo selection screen 110, as shown in FIG. 7.

If the OK button 122 is not operated (NO in step S7) and if the return button 121 is operated (YES in step S8), the process returns to step S2, that is, the trimming screen 120 returns to the photo selection screen 110 displayed in step S2 because the photo 51 to be trimmed has not been selected.

If the instructor 202 judges in step S4 that the aspect ratio of the selected photo, such as the original photo 52 (see FIG. 6), is smaller than the minimum ratio (1:1.3) of the range of the predetermined aspect ratios, it informs the display controller 201 that the original photo 51 needs margin adding processing.

In step S9, the display controller 201 performs control so that the margin add screen 130 including the photo 52 will be displayed on the operation display unit 22, as shown in FIG. 6. The display controller 201 also performs control so that the margins 52a and 52b will be added to left and right sides of the photo 52.

If the OK button 132 on the margin add screen 130 is operated (YES in step S10), the processor 203 performs margin adding processing for adding the margins 52a and 52b. As a result of margin adding processing, the photo 52c is created.

In step S5, the display controller 201 performs control so that a thumbnail image of the processed photo 52c will be disposed on the left side of the second row of the photo selection screen 110, as shown in FIG. 7.

If the OK button 132 is not operated (NO in step S10) and if the return button 131 is operated (YES in step S11), the process returns to step S2, that is, the margin add screen 130 screen returns to the photo selection screen 110 displayed in step S2 because the photo 52 to be subjected to margin adding processing has not been selected.

After the selected photos have been disposed on the photo selection screen 110 in step S5, the display controller 201 judges in step S12 whether the maximum number (ten, for example) of photos have been selected. If the maximum number of photos have not been selected (NO in step S12), the display controller 201 judges in step S13 whether the selected photos will be uploaded according to whether the send button 112 has been operated. If the send button 112 has not been operated (NO in step S13), the process returns to step S2, that is, the screen returns to the photo selection screen 110 displayed in step S2.

If the maximum number of photos have been selected (YES in step S12), the display controller 201 judges in step S14 whether the selected photos will be uploaded according to whether the send button 112 has been operated. If the send button 112 has been operated (YES in step S14), the sender 204 sends the photo file to the server device 3 via the Internet 5. In step S15, the display controller 201 performs control so that an upload screen indicating the upload progress status will be displayed on the operation display unit 22. Then, in step S16, the display controller 201 performs control so that the reservation number list screen 140 will be displayed on the operation display unit 22, as shown in FIG. 8.

(3) Canceling of Selected Photo

Figure 9:
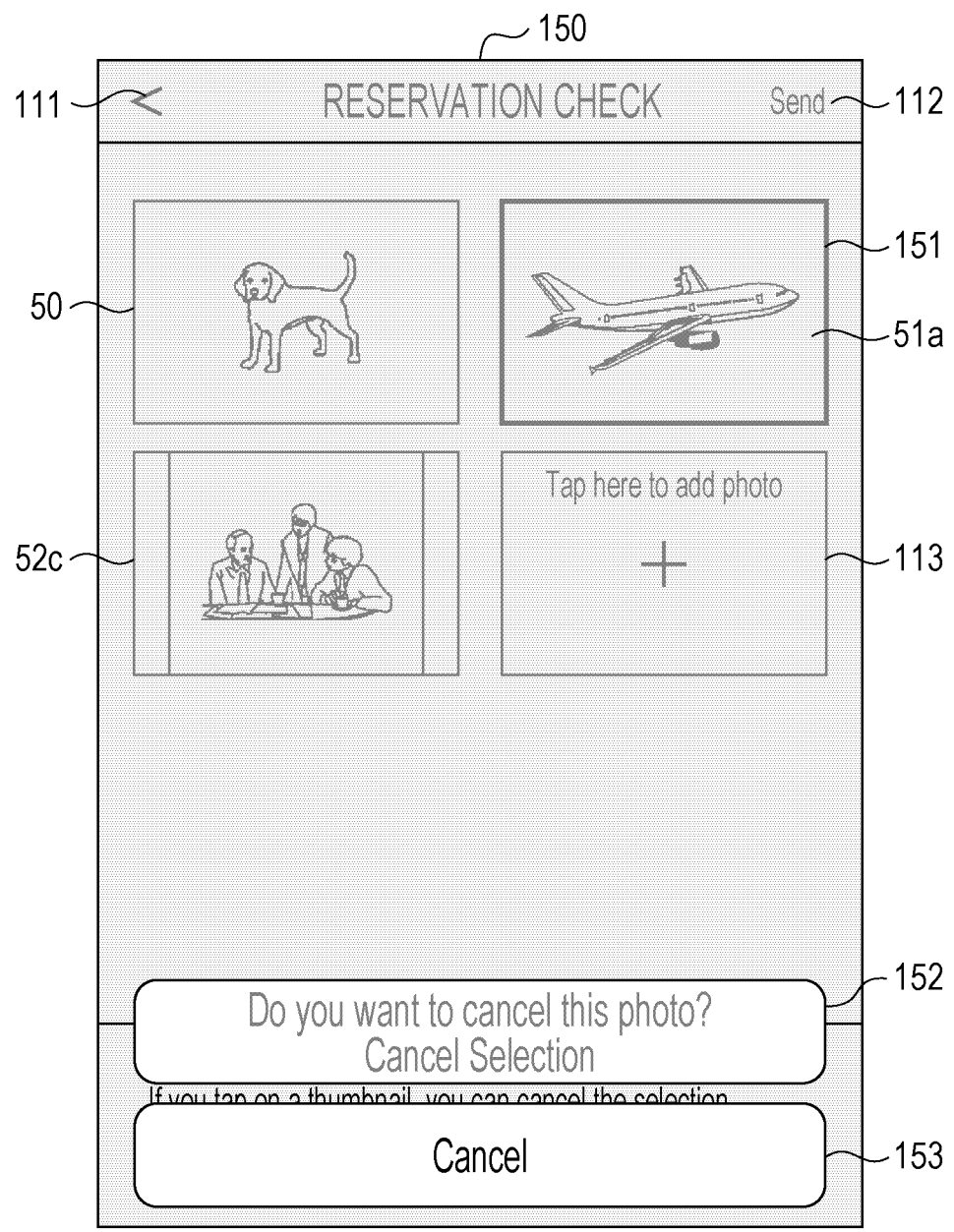
FIG. 9 illustrates an example of a photo cancel screen.

When canceling a selected photo, a user taps on a photo to be canceled on the photo selection screen 110. Typically, when tapping on a photo, the photo is displayed in an enlarged size. In this exemplary embodiment, however, a photo cancel screen 150 is displayed on the operation display unit 22, as shown in FIG. 9, instead.

Figure 10:
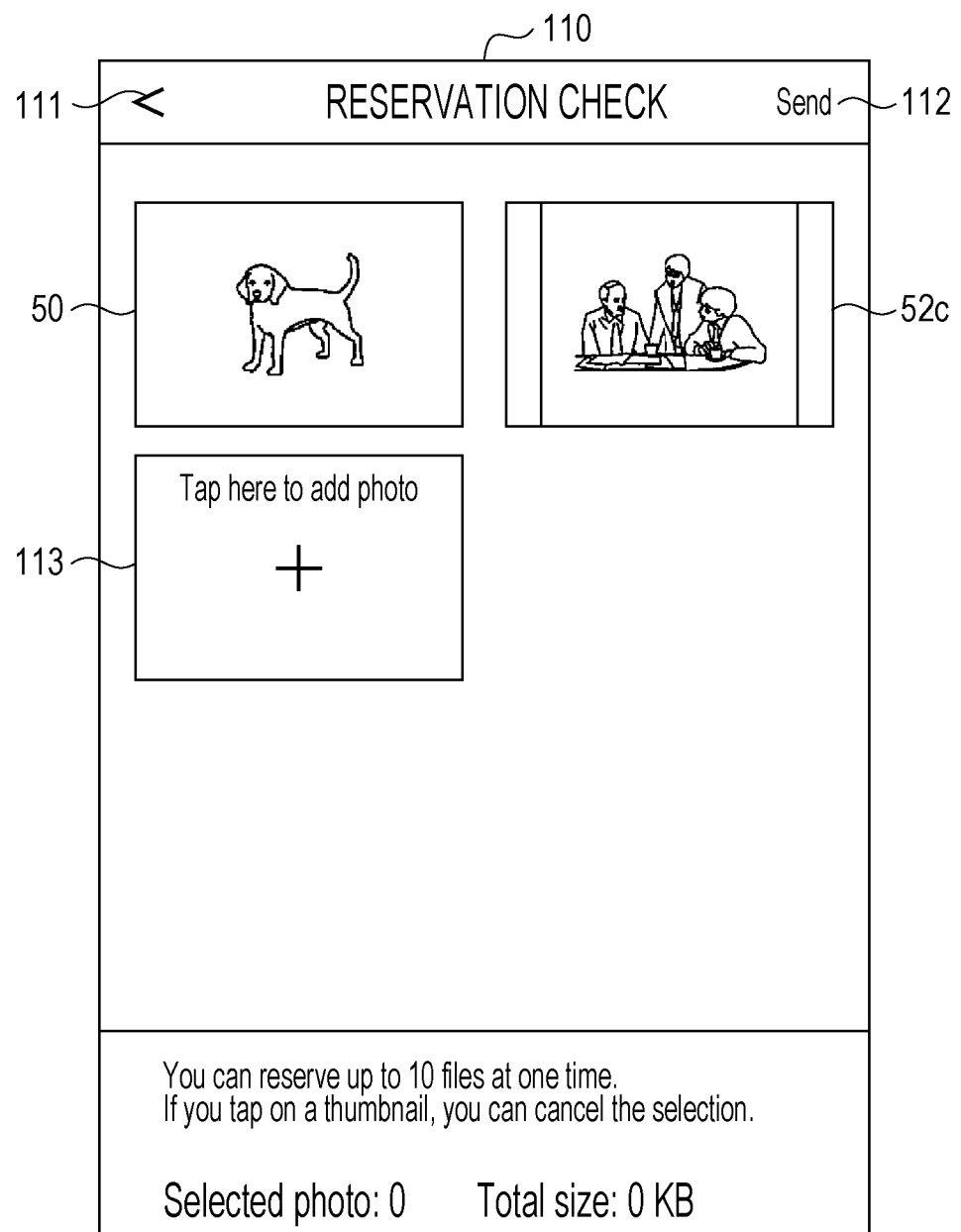
FIG. 10 illustrates an example of a photo selection screen after a photo has been canceled.

On the photo cancel screen 150, a photo 51a to be canceled is displayed with a frame 151 indicated by the thick solid lines, and also, a selection cancel button 152 and a cancel button 153 are displayed. As a result of operating the selection cancel button 152, the photo 51a is canceled, as shown in FIG. 10. If the cancel button 153 is operated, canceling of a photo is canceled. In the related art, a photo is canceled by executing four steps: selecting a trash icon; displaying radio buttons; checking a radio button for a photo to be canceled; and selecting "YES" in a check box. In this exemplary embodiment, however, a photo is canceled merely by executing two steps: tapping on a photo to be canceled; and operating the selection cancel button 152.

The present invention is not restricted to the above-described exemplary embodiment. Various modifications may be made without departing from the spirit and scope of the invention. For example, the image forming device 4 may have the functions of the server device 3. That is, the terminal device 2 sends an image to the image forming device 4. The image forming device 4 stores the image, issues a reservation number for this image, and informs the terminal device 2 of the reservation number. Upon receiving input of the reservation number from a user, the image forming device 4 prints the image on a sheet.

All or some of the elements of the control unit 20, that is, the receiver 200, the display controller 201, the instructor 202, the processor 203, and the sender 204, may be constituted by a hardware circuit, such as a field programmable gate array (FPGA) or an application specific integrated circuit (ASIC).

Some of the elements of the above-described exemplary embodiment may be omitted or changed without departing from the spirit and scope of the invention. For example, the processor 203 may be omitted from the terminal device 2, the image forming device 4 may have the processor 203 instead. In this case, instructions from the instructor 202 of the terminal device 2 are sent to the image forming device 4.

In the flowchart of the above-described exemplary embodiment, steps may be added, deleted, changed, or replaced without departing from the spirit and scope of the invention. The program used in the above-described exemplary embodiment may be provided as a result of being recorded in a computer readable recording medium, such as a compact disc-read only memory (CD-ROM). The program may be stored in an external server, such as a cloud server, and be used via a network.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
  a processor programed to
    select an image;
    provide a first instruction if a ratio of a longer side to a shorter side of the selected image exceeds a maximum ratio of a range of predetermined ratios, the first instruction being an instruction to remove an end portion of the selected image in a direction parallel to the longer side so that the ratio of the longer side to the shorter side of the selected image will be contained within the range of the predetermined ratios; and
    provide a second instruction if the ratio of the longer side to the shorter side of the selected image is smaller than a minimum ratio of the range of the predetermined ratios, the second instruction being an instruction to add a margin to an end portion of the selected image in the direction parallel to the longer side so that the ratio of the longer side to the shorter side of the selected image will be contained within the range of the predetermined ratios.

2. The image processing apparatus according to claim 1, wherein the processor is further programed to
  perform control so that a scaled-down image of the selected image will be displayed and so that a range of a portion to be removed from the selected image will be changeable if the ratio of the longer side to the shorter side of the selected image exceeds the maximum ratio of the range of the predetermined ratios.

3. The image processing apparatus according to claim 2, wherein the processor performs control so that a mark indicating a range of an image to be obtained by removing the end portion of the selected image will be superposed on the scaled-down image and so that the range of a portion to be removed from the selected image will be changeable by shifting the mark.

4. The image processing apparatus according to claim 1, wherein the processor is further programed to
  perform control so that a scaled-down image of the selected image will be displayed and so that a range of the margin will not be changeable if the ratio of the longer side to the shorter side of the selected image is smaller than the minimum ratio of the range of the predetermined ratios.

5. The image processing apparatus according to claim 1, wherein the processor is further programed to
  send the selected image and the provided one of the first and the second instructions to an external device.

6. The image processing apparatus according to claim 2, wherein the processor is further programed to
  send the selected image and the provided one of the first and the second instructions to an external device.

7. The image processing apparatus according to claim 3, wherein the processor is further programed to
  send the selected image and the provided one of the first and the second instructions to an external device.

8. The image processing apparatus according to claim 4, wherein the processor is further programed to
  send the selected image and the provided one of the first and the second instructions to an external device.

9. The image processing apparatus according to claim 1, wherein the processor is further programed to
  process the selected image in accordance with the provided one of the first and the second instructions; and
  send the image processed by the processor to an external device.

10. The image processing apparatus according to claim 2, wherein the processor is further programed to
  process the selected image in accordance with the provided one of the first and the second instructions; and
  send the image processed by the processor to an external device.

11. The image processing apparatus according to claim 3, wherein the processor is further programed to
  process the selected image in accordance with the provided one of the first and the second instructions; and
  send the image processed by the processor to an external device.

12. The image processing apparatus according to claim 4, wherein the processor is further programed to
  process the selected image in accordance with the provided one of the first and the second instructions; and
  send the image processed by the processor to an external device.

13. The image processing apparatus according to claim 1, wherein the processor is further programed to
  select a type of sheet on which the selected image will be printed, wherein
  if a photo sheet is selected by the processor, the processor processes the selected image in accordance with the provided one of the first and the second instructions,
  if a sheet other than the photo sheet is selected by the processor, the processor does not process the selected image in accordance with the provided one of the first and the second instructions.

14. The image processing apparatus according to claim 13, wherein the processor is further programed to
  perform control so that a check screen for print settings will be displayed if the sheet other than the photo sheet is selected by the processor and so that an end portion of the selected image in the direction parallel to the longer side will not be removed nor will a margin be added to an end portion of the selected image in the direction parallel to the longer side if the photo sheet is selected.

15. A non-transitory computer readable medium storing a program causing a computer to execute a process, the process comprising:
  selecting an image;
  providing a first instruction if a ratio of a longer side to a shorter side of the selected image exceeds a maximum ratio of a range of predetermined ratios, the first instruction being an instruction to remove an end portion of the selected image in a direction parallel to the longer side so that the ratio of the longer side to the shorter side of the selected image will be contained within the range of the predetermined ratios; and
  providing a second instruction if the ratio of the longer side to the shorter side of the selected image is smaller than a minimum ratio of the range of the predetermined ratios, the second instruction being an instruction to add a margin to an end portion of the selected image in the direction parallel to the longer side so that the ratio of the longer side to the shorter side of the selected image will be contained within the range of the predetermined ratios.

16. An image processing apparatus comprising:
  selecting means for selecting an image; and
  instructing means for providing a first instruction if a ratio of a longer side to a shorter side of the selected image exceeds a maximum ratio of a range of predetermined ratios, the instruction being an instruction to remove an end portion of the selected image in a direction parallel to the longer side so that the ratio of the longer side to the shorter side of the selected image will be contained within the range of the predetermined ratios, and a second instruction if the ratio of the longer side to the shorter side of the selected image is smaller than a minimum ratio of the range of the predetermined ratios, the second instruction being an instruction to add a margin to an end portion of the selected image in the direction parallel to the longer side so that the ratio of the longer side to the shorter side of the selected image will be contained within the range of the predetermined ratios.

* * * * *